United States Patent [19]

Schmidt et al.

[11] 3,839,264

[45] Oct. 1, 1974

[54] VARNISHES OF POLYESTERIMIDES BASED ON PENTAERYTHRITOL

[75] Inventors: Karl Schmidt, Hamburg-W; Ferdinand Hansch, Hamburg-Osdorf; Hans-Malte Rombrecht, Hamburg-Banrefeld, all of Germany

[73] Assignee: Dr. Beck & Co. AG, Eiselensweg, Hamburg, Germany

[22] Filed: Mar. 15, 1972

[21] Appl. No.: 235,013

Related U.S. Application Data

[63] Continuation of Ser. No. 64,101, July 29, 1970, abandoned, which is a continuation of Ser. No. 833,840, May 19, 1969, abandoned, which is a continuation of Ser. No. 707,879, Feb. 23, 1968, abandoned, which is a continuation of Ser. No. 384,262, July 21, 1964, abandoned.

[52] U.S. Cl. ......... 260/33.4 P, 117/128.4, 117/231, 260/75 N

[51] Int. Cl. ...................... C08g 20/32, C08g 41/00

[58] Field of Search ................... 260/75 N, 33 YP

[56] References Cited

UNITED STATES PATENTS

| | | | |
|---|---|---|---|
| 2,777,830 | 1/1957 | Shivers | 260/275 |
| 2,936,296 | 5/1960 | Precopio et al. | 260/33.4 |
| 3,234,181 | 2/1966 | Olivier | 260/47 |
| 3,238,181 | 3/1966 | Anderson | 260/65 |
| 3,274,159 | 9/1966 | Kluiber | 260/75 |
| 3,697,471 | 10/1972 | Schmidt et al. | 260/33.4 P |

*Primary Examiner*—Melvin Goldstein
*Attorney, Agent, or Firm*—Burgess, Dinklage & Sprung

[57] ABSTRACT

Electrical insulating varnish which is a solution of polyesterimide resin composed of a polyhydric alcohol component, a polycarboxylic acid component and five membered imide rings in the chain. At least part of the alcohol component is derived from pentaerythritol.

7 Claims, No Drawings

VARNISHES OF POLYESTERIMIDES BASED ON PENTAERYTHRITOL

This is a continuation of Ser. No. 64,101 filed July 29, 1970 which is a continuation of Ser. No. 833,840 filed May 19, 1969, which is a continuation of Ser. No. 707,879 filed Feb. 23, 1968, which is a continuation of Ser. No. 384,262, filed July 21, 1964 all now abandoned.

The invention relates to a process for the manufacture of wire varnishes based on polyestermide resins.

Polyestermide resins, i.e. synthetic products in which the polymeric molecule contains both ester groups and five membered cyclic imide groups as chain elements, have lately come to be regarded as excellent resin components when used in phenolic solvents to form varnishes for the insulation of electrical wires. The manufacture and use of these polyesterimide resins and the resultant wire varnishes are described, for example, in U.S. Pat. Ser. No. 238,315 and German Patent applications B 69 201 IV b/39c and B 72 145 IV b/39c.

These polymeric compounds, containing on the one hand ester groups and on the other cyclic imide groups in the polymeric chain, can be obtained, for example, using a process in which polybasic carboxylic acids are condensed with polyhydric alcohols, possibly in conjunction with hydroxycarboxylic acids, aminocarboxylic acids and/or amino alcohols, by arranging that at least one of the starting materials used contains one or more five-membered imide rings in such an arrangement that the functional groups of the compound concerned are linked with one another via different ring members of the particular imide ring. The five membered cyclic imide ring groups can be composed of an aromatic carboxylic acid anhydride component and a primary amine component.

The formation of the imide rings may however take place simultaneously or even after the formation of the polymeric chain. That is to say, the condensation reaction for forming the cyclic imide ring, and consequently for forming the corresponding component of the polyesterimide chain, can take place in the presence of the reactant which produces the ester groups. In this case, there is practically simultaneous formation of ester groups and cyclic imide groups, the net result being the formation of the desired polymeric molecule. These features are described separately in the said Patent Specifications. Finally, within the limits of this process, the reaction of cyclic carboxylic acid anhydride groups with primary amino groups may, if desired, be carried out in two stages such that first of all polymeric amido-carboxylic acids are formed and then these are further condensed in a second process stage to form polyimides. In this case too, by using components containing ester groups, synthetic products are obtained which simultaneously contain ester groups and imide groups.

The known technical advantages of varnish films stoved onto copper wire, are their excellent thermal stability, good resistance to attack by solvents, high degree of hardness and flexibility. In particular, they behave very well in the heat shock test.

For many electrical engineering applications, however, it is required that a winding should exhibit high resistance to extreme excesses of temperature, typical applications including two-motion selectors as used in telephone work, windscreen-wiper motors, portable power tools, and so on. For applications of this sort, combinations of epoxy resins have hitherto proved very effective, insulations for so-called burn-resistant wires having been produced from these materials. However, varnishes of this type do not possess sufficient long-term resistance to heating effects nor is their resistance to heat-shock adequate. Terephthalic acid polyesters, while possessing good long-term resistance to heating effects, nevertheless are found to be inadequate when subjected to heat shock and thermal overloading.

According to the present invention, there is provided an electrically insulating varnish comprising a solution of polyesterimide resin in which the polyhydric alcohol component used to prepare the resin consists of or includes pentaerythritol. Such varnishes are found to exhibit a very significant improvement in resistance to thermal overloading when used as insulation on wires.

In the varnishes of the invention, instead of the chemically pure pentaerythritol it is equally possible to use commercially available pentaerythritol which, besides the pure mono-compound, also contains varying quantities of dipentaerythritol, the product of an etherification reaction between two pentaerythritol molecules. It has been found when testing the wire varnishes of the invention, that insulations can be produced with such products which can withstand the overloading resulting from excessive electric current and consequent overheating, for substantially longer periods than corresponding insulations made for esterimide resins in which trivalent alcohols such as glycerine, trimethylolpropane and so on have been used in order to fit them for application as a burn-resistant wire insulation. The other properties of the esterimide resins such as excellent resistance to heat-shock, high hardness value, resistance to solvent attack and good dielectric properties, remain undiminished. This result is the more remarkable since the use of pentaerythritol in normal terephthalic acid polyesters is said to produce no significant improvement in the resistance to thermal overloading.

Wire varnishes of the type proposed in accordance with the invention can be produced for example by reacting pentaerythritol (possibly mixed with dihydric alcohols) with polybasic (in particular dibasic) carboxylic acids containing imide groups. A particularly important dicarboxylic acid for such use, is bis-4.4'- (trimellitic acid imido)-diphenylmethane. It is possible to work directly in the presence of phenolic solvents, the polyesterimides produced being dissolved in such solvents. Dicarboxylic acids containing imide groups can also be employed when mixed with other polybasic carboxylic acids such as terephthalic acid, isophthalic acid and/or minor quantities of trimellitic acid or anhydrides thereof. The dicarboxylic acid, bis-4,4'- (trimellitic acid imido)-diphenylmethane, containing the imide groups may also be made from one mol of 4,4'-diaminodiphenylmethane and 2 to 2.2 mols of trimellitic acid, preferably in the form of its anhydride, in the presence of phenolic solvents, and immediately thereafter or at the same time converted to polyesterimides. Advantageously, trimellitic acid anhydride and 4,4'-diaminodiphenylmethane are introduced in approximately equal amounts into the mixture of phenolic solvent (e.g. cresol) and polyhydric alcohol or alcohols, a slight excess of trimellitic acid anhydride being recommended, and the resultant mixture reacted at elevated temperature during which imides are formed by esterification. Imide formation takes place chiefly in the temperature range between 120° and 170°C. On the other hand, for esterification the temperatures selected may conveniently be higher, up to around the boiling point of the cresol. If a rectification head is used, there is no significant loss of polyhydric alcohol or cresol even at these high temperatures; all that happens is that the water produced in the course of the reaction is distilled off. The esterification reaction can be simplified by having recourse to the usual esterification aids. Metal catalysts such as butyl titanate, tin and antimony compounds, have proved particularly effective in this respect. Using this procedure, a solution of the esterimide resin in cresol is obtained directly.

Advantageously, the dihydric alcohol used in the preparation of the esterimide resins of the invention is ethylene glycol. The invention is, however, by no means limited to the use of this glycol and products are obtained using other dihydric alcohols, such as 1,3-propandiol, bis-4,4'-(β-hydro-xyethoxyphenyl)-2,2'-propane which are far superior to the known materials used for the same purpose so far as their combining desirable properties is concerned.

It is of particular advantage if the dihydric alcohol used is, for some part at least, one containing two imide groups in the molecule, e.g. bis-N,N'-(2-hydroxyethyl)-pyromellitic acid diimide or bis-N,N'-(3-hydroxypropyl)-pyromellitic acid diimide, which can be prepared from one mol of pyromellitic acid dianhydride and 2 to 2.1 mols of 2-aminoethanol or 3-aminopropanol. Advantagously, the process will be such that in a first reaction stage, in the presence of phenolic solvents such as cresol and possibly in the presence of the alcohols, such as pentaerythritol and ethylene glycol, required for the subsequent esterification reaction, the dihydric alcohol containing the appropriate imide groups is prepared from one mol of pyromellitic acid dianhydride and 2 to 2.1 mols of 2-aminoethanol or 3-aminopropanol at a temperature of up to 180°C. After cooling to 70° to 80° C, 4,4'-diaminodiphenylmethane and trimellitic acid anhydride, possibly together with other polybasic carboxylic acids, are added and the dicarboxylic acid containing the imide groups formed at between 120° and 170° C, this dicarboxylic acid subsequently being reacted at a temperature of up to 200°C with the alcohols already present in the reaction mixture to form the polyesterimide, if desired, with the addition of esterification acids, such as metal catalysts. As already described above by using a rectification head, it can be ensured that substantially only the reaction water is distilled off and that no loss of alcohol or cresol occurs. The esterimide resin then appears as a cresol solution.

The pentaerythritol is preferentially employed in quantities of from 2 to 10 percent by weight, preferably 3 to 7 percent by weight, these values being referred to the total weight of raw material used for the polyesterimide resin.

The following examples are intended to show how the operation of a process in accordance with the invention enables the resistance to thermal loading to be increased. These examples are given by way of explanation but are in no way limitative of the proposed process.

The pure monopentaerythritol used was a commercial product having a melting point of at least 250°C and a minimum content of monopentaerythritol of 98 percent. The commercial pentaerythritol used was a commercially available product having a melting point of between 230°C and 235°C and a content of between 10 and 15 percent dipentaerythritol.

The over-load test is carried out in the following manner;

The insulated wire of 1mm nominal diameter is wound in the form of a coil having four layers, on a porcelain test body as specified in DIN 46 453. An iron core is inserted inside the test body. A voltage is then applied across the coil which is such that the initial current amounts to 14.5 amperes. The resistance increases due to the heating effect of the current and the current drops to about 9 amperes. When partial failure of the insulation results in short-circuiting between windings and the current increases to 11 amps, the test is considered completed. The time required for this to happen is regarded as a measure of the over-load resistance of the wire insulation.

Example 1 refers to a terephthalic polyester in which pentaerythritol has been employed. The pencil hardness grade is low and the results of heat-shock tests and over-load tests are inadequate.

Examples 2 and 4 relate to polyesterimides with proportions of terephthalic acid. Although the insulation of Example 2 has a resistance of 25 minutes in the over-load test, ethylene glycol and glycerine being employed, in Example 4 in which ethylene glycol and pentaerythritol are used, the resistance of the wire insulation when subjected to this same test increases to more than 60 minutes.

There are similar differences between the polyesterimides of Examples 3 and 5; the insulation of Example 3, produced using ethylene glycol and glycerine, has a resistance of 25 minutes in the over-load test whilst the insulation of Example 5, using ethylene glycol and pentaerythritol, has a resistance of 90 minutes.

In the polyesterimides of Examples 6 and 7, besides pentaerythritol, ethylene glycol, propandiol-1,3 and bis-4,4'-(β-hydroxyethoxyphenyl)-2,2'-propane were used as bivalent alcohols. Here too, the resistance values obtained in the over-load tests were more than 60 minutes.

Examples 8, 9 and 10 relate to polyesterimides in which, besides pentaerythritol, dihydric alcohols in the form of ethylene glycol and bis-N,N'-(2-hydroxyethyl)-promellitic acid diimide, or bis N,N'-(3-hydroxypropyl)-promellitic acid diimide were used. Here to, the values obtained in the over-load tests were greater than 60 minutes.

EXAMPLE 1

873.4 Grams (46 equivalent %) of dimethyl terephthalate, 241.8 grams (39 equivalent %) of ethylene glycol and 102.2 grams (15 equivalent %) of monopentaerythritol were introduced together with 20 millilitres of xylene into a 3-necked flask equipped with a stirrer, a thermometer and a rectification column. Heating was carried out in a nitrogen atmosphere to a temperature of 130°C. 0.2 Grams of lead acetate were then added and heating continued. Distillation began at 150°C. After 3½ hours a temperature of 240°C was reached and a distillate of 317 millilitres had been obtained. The temperature was maintained at 240°C and, after a quarter of an hour, a further 22 millilitres of distillate had been produced and the viscosity had increased sharply. At this point 1034 grams of cresol were added so that an approximately 47 percent resin solution resulted and this was filtered. Further thinning to produce a 35 percent varnish was effected using cresol and solvent naphtha. The varnish exhibited a tendency to crystallise and remained in clear solution for only a very short time after cooling. This varnish was applied to a copper wire of 1 mm diameter, in a horizontal enamelling furnace.

Technical data;
Furnace length 3.5 m.
Furnace temperature 480°C
Mechanism used for application was roller and felt
Number of Applications 6
withdrawal rate 4.0 m/min.,
applied thickness (increase in wire diameter) 0.05 m.m.

Under test, the following results were obtained for the varnish insulation:
Pencil hardness grade 2H
Pencil hardness grade after being held for 30 minutes in benzene at 60°C HB
Pencil hardness grade after being held for 30 minutes in alcohol at 60°C 2H Heat-shock test:
A turn of wire about a diameter equal to the wire diameter, exhibited numerous wide cracks after annealing for one hour at 155°C. A turn having a diameter equal to four times the wire diameter was still in order after similar treatment.

Overload test:
The varnish partly broke away after 28 minutes.

EXAMPLE 2

98.4 Grams of dimethylterephthalate, 29.0 grams of glycerine and 43.5 grams of ethylene glycol were slowly heated up together with 20.0 grams of cresol, 1.0 grams of cerium-Nuodex (cerium-naphthenate) and 0.3 grams of calcium-Nuodex (calcium-naphthenate), in a 2 litre 3-necked flask equipped with a stirrer, thermometer and rectification head. From 140°C., the temperature was raised at a rate of about 5°C per hour until at about 200°C, the theoretical quantity of methanol had been distilled off. The terephthalic acid ester formed was diluted with 170 grams of cresol and cooled to 80°C. At this point, 149.7 grams of trimellitic acid anhydride and 76.3 grams of 4,4'-diaminodiphenylmethane were added and the temperature again raised. At about 140°C. the dicarboxylic acid bis-4,4'-(trimellitic acid imido)-diphenylmethane was precipitated in the form of a thick, yellow deposit and water was distilled off. The temperature was raised in such a way that the head temperature remained at about 100°C. At this phase of the process, it was predominantly water which was distilled off, this being split off during the esterification reaction associated with the reaction between trimellitic acid anhydride and 4,4'-diaminodiphenylmethane to form the dicarboxylic acid. When the sediment had cleared, the temperature was maintained for a further 2 hours at between 205°C and 215°C and thinning then carried out using cresol, solvent naphtha and xylene until a solids percentage of about 45 percent was obtained. Then 5.8 grams of butyl titanate and 1 gram of p-toluenesulphonic acid plus other solvents were added so that with a solids content of 28 percent the varnish had a viscosity of about 110 seconds measured in a 4 millimetre DIN cup.

This varnish was applied to a 1 mm diameter copper wire as in Example 1.

Under test, the varnish insulation gave the following results:
Pencil hardness 4H
Pencil hardness after being held for 30 minutes in benzene at 60°C 3H
Pencil hardness after being held for 30 minutes in alcohol at 60°C 3H Heat-shock test:
A turn of wire about a diameter equal to the wire diameter, was still in good order after annealing for one hour at 200°C.

Overload test:
Approximately 25 minutes.

After annealing the wire for 16 hours at 200°C, the ductility of the varnish film was 26 percent and the insulation withstood winding about a diameter four times the wire diameter whilst under a tensile stress of 6 kg. per square mm.

EXAMPLE 3

273 Grams of bis-4,4'-(trimellitic acid imido)-diphenylmethane, 55.8 grams of ethylene glycol, 31.0 grams of glycerol and 160 grams of cresol were heated together with 2 grams of tin-II-oxalate and 2 grams of antimony-III-oxide in a 3-necked flask equipped with a stirrer, thermometer and a rectification column. Distillation commenced at 180°C. The temperature was so controlled that water was more or less exclusively distilled off, (the head temperature of the column not being allowed to exceed 100°C. After 6 hours, a temperature of 190°C was measured in the flask and the deposit had cleared. 22 ml. had distilled off. At this point, once again 273 grams of bis-4,4'-(trimallitic acid imido)-diphenylmethane and 110 grams of cresol were added and further heated in the same manner. After a further 8 hours, the flask temperature had reached 210°C and 30 ml. had been distilled off. The now clear resin solution was thinned using cresol, solvent naphtha and xylene to a 31 percent varnish and applied, in the manner described in Example 1, to a 1 mm. diameter copper wire.

Under test the wire insulation produced the following results:
Pencil hardness grade 4H
Pencil hardness grade after being held for 30 minutes in benzene at 60°C. 3H
Pencil hardness grade after being held for 30 minutes in alcohol at 60°C. 3H Heat-shock test:
A turn about a diameter equal to the wire diameter was still in good order after annealing for one hour at 250°C.

Overload test:
25 minutes.

After 16 hours of annealing at 200°C, the ductility of the varnish film was 22 percent.

EXAMPLE 4

95.8 Grams of dimethyl terephthalate, 20.7 grams of commercial pentaerythritol and 51.8 grams of ethylene glycol was reacted, in the manner described in Example 2, together with 20.0 grams of cresol, 0.6 grams of cerium-Nuodex (cerium naphthenate) and 0.3 grams of calcium-Nuodex (calcium naphthenate) to form a terephthalic acid ester, methanol being distilled off in the process. Thinning was then carried out using 200 grams of cresol and at 80°C 146 grams of trimellitic acidanhydride and 75.2 grams of 4,4'-diaminodiphenylmethane were added. From this point, the procedure was described in Example 2. The resultant resin solution was thinned to form a varnish having a solids content of 26 percent and a viscosity of 130 secs., using cresol, solvent naphtha and xylene. After mixing with 1.57 percent butyl titanate and 0.26 percent p-toluenesulphonic acid, the percentages being based upon the solids content of the varnish, the varnish was applied in the manner described in Example 1, to a 1 mm. diameter copper wire.

Under test, the varnish insulation gave the following results:
Pencil hardness grade 4H
Pencil hardness grade after being held for 30 minutes in benzene at 60°C. 3H
Pencil hardness grade after being held for 30 minutes in alcohol at 60°C. 3H
Heat-shock test:
A turn about a diameter equal to the wire diameter, was still in good order after annealing for one hour at 200°C.
Overload test:
> 60 minutes.
After 16 hours of annealing at 200°C, the ductility of the varnish film was 25 percent.

EXAMPLE 5

461 Grams of trimellitic acid anhydride, 234 grams of 4,4'-diaminodiphenylmethane, 72 grams of ethylene glycol, 35 grams of monopentaerythritol and 500 grams of cresol were heated together with 2 grams of tin-II-oxalate and 2 grams of antimony-III-oxide in a 3-necked flask equipped with stirrer, thermometer and rectification column. At about 140°C, a thick, yellow deposit was precipitated and water began to distill off. The thick viscous deposit was well agitated and heated further, the head temperature of the column being as far as possible kept steady at 100°C. After 6 hours, the flask temperature was 180°C and 50 ml had been distilled off; the deposit was almost clear. After a further 6 hours, during which the temperature was increased to 200°C, a further 60 ml, had been distilled off and the deposit was completely clear. The resin solution was then thinned to a 28 percent solids varnish, using cresol, solvent naphtha and xylene, and applied to a 1 mm. diameter copper wire as in Example 1.

Under test, the varnish insulation gave the following results:
Pencil hardness grade 4H
Pencil hardness grade after being held for 30 minutes in benzene at 60°C 3H
Pencil hardness grade after being held for 30 minutes in alcohol at 60°C 3H
Heat-shock test:
A turn about a diameter equal to the wire diameter was in good order after annealing for one hour at 250°C.
Overload test:
> 90 minutes
After annealing for 16 hours at 200°C, the ductility of the varnish film was 31 percent and the insulation withstood being coiled about a diameter equal to the wire diameter whilst the wire was under a 6 kilopounds/sq.mm tensil stress.

EXAMPLE 6

154 Grams of trimellitic acid anhydride, 78 grams of 4,4'-diaminodiphenylmethane, 24.8 grams of ethylene glycol, 34 grams of propanediol-1.3, 18.6 grams of monopentaerythritol and 100 grams of cresol were heated, together with 1.5 grams of tin-II-oxalate and 1.5 grams of antimony-III-oxide (as described in Example 5), until the deposit became clear. Then a further 154 grams of trimellitic acid anhydride, 78 grams of 4,4'-diaminodiphenylmethane and 100 grams of cresol were added and heating continued in the same way until the deposit again became clear. The resin solution was thinned to a solids content of about 28 percent using cresol, solvent naphtha and xylene, and applied to 1 mm diameter copper wire as in Example 1. Under test, the varnish insulation gave the following results:
Pencil hardness grade 3H
Pencil hardness grade after being held for 30 minutes in benzene at 60°C 2H
Pencil hardness grade after being held for 30 minutes in alcohol at 60°C 2H
Heat-shock test:
A turn of wire about a diameter equal to twice the wire diameter was still in good order after annealing for one hour at 250°C.
Overload test:
> 60 minutes.

EXAMPLE 7

77 Grams of trimellitic acid anhydride, 39 grams of 4,4'-diaminodiphenylmethane, 125 of bis-4,4'-($\beta$-hydroxyethoxyphenyl)-2,2-propane, 9.3 grams of monopentaerythritol and 100 grams of cresol were heated together with 1.5 grams of tin-II-oxalate and 1.5 grams of antimony-III-oxide (as in Example 5) until the deposit had become clear. Then, a further 77 grams of trimellitic acid anhydride, 39 grams of 4,4'-diaminodiphenylmethane and 60 grams of cresol were added, and heating continued in the same manner until the deposit again became clear. The resin solution was thinned to a solids content of about 28 percent, using cresol, solvent naphtha and xylene and, in the manner described in Example 1, applied to 1 mm. diameter copper wire.

Under test, the varnish insulation gave the following results:
Pencil hardness grade 4H
Pencil hardness grade after being held for 30 minutes in benzene at 60°C 3H
Pencil hardness grade after being held for 30 minutes in alcohol at 60°C 3H
Heatshock test:
A turn of wire about a diameter equal to the wire diameter was still in good order after annealing for one hour at 250°C.
Overload test:
> 60 minutes.

EXAMPLE 8

23 Grams of monoethanolamine, 25 grams of ethylene glycol, 18 grams of commercial pentaerythritol and 100 grams of cresol, together with 1 gram of tin-II-oxalate and 1 gram of antimony-III-oxide, were introduced into a 1 litre 3-necked flask equipped with a stirrer, thermometer, gas inlet tube and rectification column. 38 grams of pyromellitic acid dianhydride were added stirring all the time. The deposit was then heated to 180°C until the quantity of water distilled off indicated that the pyromellitic acid dianhydride had reacted with the monethanolamine to form bis-N,N'-(2 hydroxyethyl)-pyromellitic acid diimide. After cooling to 40°C, 100 grams of cresol, 39 grams of 4,4'-diaminodiphenylmethane and 78 grams of trimellitic acid anhydride were added. This done, the temperature was increased to 190°C until the yellow precipitate appearing at about 145°C disappeared again. After cooling at 110°C, once more 39 grams of 4,4'-diaminodiphenylmethane and 78 grams of trimellitic acid anydride were added. Heating was then continued until at 195°C the yellow deposit meanwhile produced and disappeared. At 110°C, for the third time 38 grams of 4,4'-diaminodiphenylmethane and 78 grams of trimellitic acid anhydride were added. Subsequently, heating was continued at 200°C until the yellow deposit produced in the meantime had disappeared again. Esterification was then completed by heating to between 205° and 215°C, for one hour, 52 grams of a liquid consisting predominantly of water were distilled off.

The resultant resin solution was thinned to the concentration usual in wire varnishes by the addition of 500 grams of cresol and 200 grams of solvent naphtha and the varnish applied to copper wire in the manner indicated in Example 1.

Under test, the varnish insulation yielded the following results:

Pencil hardness grade 4H
Pencil hardness grade after being held for 30 minutes in benzene at 60°C 3H
Pencil hardness grade after being held for 30 minutes in alcohol at 60°C 3H
Heat-shock test;
A turn of wire about a diameter equal to the wire diameter was still in good order after annealing for one hour at 250°C.
Overload test:
> 75 minutes.
After annealing the wire for 16 hours at 200°C, the ductility of the varnish film was 30 percent and the insulation withstood being wound about a diameter equal to four times the wire diameter whilst the wire was under a 6 kilopound per sq.mm. tensile stress.

EXAMPLE 9

Using the process described in Example 8, an esterimide resin in cresol solution was prepared from the following starting material: 20 grams of ethylene glycol, 18 grams of commercial pentaerythritol, 38.5 grams of 3,-propanolamine, 54.5 grams of pyromellitic acid dianhydride, 1 gram of tin-II-oxalate, 1 gram of antimony-III-oxide, 117 grams of 4,4'-diaminodiphenylmethane, and, as in Example 8, 234 grams of trimellitic acid anydride, diaminodiphenylmethane and trimellitic acid anhydride were added to the reaction mixture in 3 equal parts.

The resin solution, after thinning with cresol and solvent naphtha, was applied to copper wire in the manner of Example 1.

Under test, the varnish insulation yielded the following results:

Pencil hardness grade 4H
Pencil hardness grade after being held for 30 minutes in benzene at 60°C 2-3H
Pencil hardness grade after being held for 30 minutes in alcohol at 60°C 3H
Heat-shock test:
A turn of wire about a diameter equal to the wire diameter, was still in good order after annealing for one hour at 250°C.
Overload test:
> 60 minutes.
After 16 hours of annealing the wire at 200°C, the ductility of the varnish film as 30 percent and the insulation withstood being wound about a diameter equal to four times the wire diameter when the wire was under a tensile stress of 6 kilopounds per sq.mm.

EXAMPLE 10

Using the process disclosed in Example 8, an esterimide resin in cresol solution was prepared from the following starting materials: 7.8 grams of ethylene glycol, 30.6 grams of commercial pentaerythritol, 37.4 grams of monoethanolamine, 65.5 grams of pyromellitic acid dianhydride, 1 gram of tin-II-oxalate, 1 gram of antimony-III-oxide, 117 grams of 4,4'-diaminodiphenylmethane and 234 grams of trimellitic acid anhydride.

As in Example 8, diaminodiphenylmethane and trimellitic acid anhydride were added to the reaction mixture in each case in two equal proportions. The resin solution, after thinning with cresol and solvent naphtha, was applied to copper wire in the manner of Example 1.

Under test, the varnish insulation yielded the following results:

Pencil hardness grade 4H
Pencil hardness grade after being held for 30 minutes in benzene at 60°C 3H
Pencil hardness grade after being held for 30 minutes in alcohol at 60°C 3H
Heat-shock test:
A turn of wire about a diameter equal to the wire diameter, was still in good order after annealing for one hour at 250°C.
Overload test:
120 minutes.

We claim:
1. An electrically insulating varnish comprising a solution in a phenolic solvent of a polyesterimide resin composed of polymer containing both ester groups composed of a polyhydric alcohol component and a polycarboxylic acid component, and five membered cyclic imide groups in the polymeric chain composed of an aromatic carboxylic acid anhydride component and a primary amine component, said polyhydric alcohol component comprising at least one dihydric alcohol, and pentaerythritol in an amount of 2 to 10 percent referred to the total weight of raw materials for the polyesterimide resin.

2. A varnish according to claim 1, wherein the polybasic acid component used to form said polyesterimide resin comprises bis-4, 4' - (trimellitic acid-imido)-diphenylmethane.

3. A varnish according to claim 2, wherein said polybasic acid component includes an acid selected from the group consisting of terephthalic acid, isophthalic acid, and trimellitic acid.

4. A varnish according to claim 1 wherein said polyhydric alcohol component includes at least one dihydric alcohol selected from the group consisting of bis-N, N' - (2-hydroxethyl)-pyromellitic acid diimide and bis-N, N'-(3-hydroxypropyl)-pyromellitic acid diimide.

5. A varnish according to claim 4, wherein said polyhydric alcohol component includes at least one dihydric alcohol selected from the group consisting of ethylene glycol and propylene glycol.

6. A varnish according to claim 1, said solution being of said polyesterimide in a cresol solvent.

7. A varnish according to claim 1, said pentaerythritol being used in an amount of 3–7 percent by weight, referred to the total weight of raw materials for the polyesterimide resin.

* * * * *

UNITED STATES PATENT OFFICE
CERTIFICATE OF CORRECTION

Patent No. 3,839,264      Dated October 1, 1974

Inventor(s) Karl Schmidt, et al.

It is certified that error appears in the above-identified patent and that said Letters Patent are hereby corrected as shown below:

The data sheet, add:

--[30] Foreign Application Priority Data

August 1, 1963   Germany   B 72 945--

Signed and sealed this 8th day of April 1975.

(SEAL)
Attest:

RUTH C. MASON
Attesting Officer

C. MARSHALL DANN
Commissioner of Patents
and Trademarks